N. GABEL.
Hay Loader.
No. 98,581.  Patented Jan. 4, 1870.
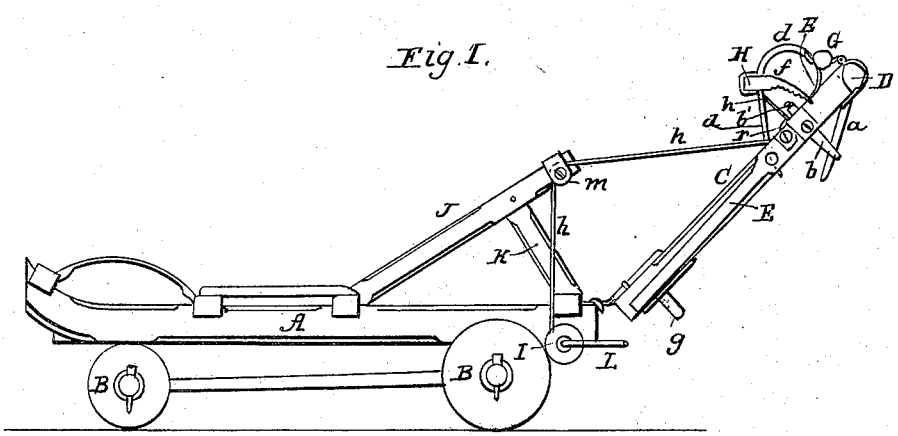
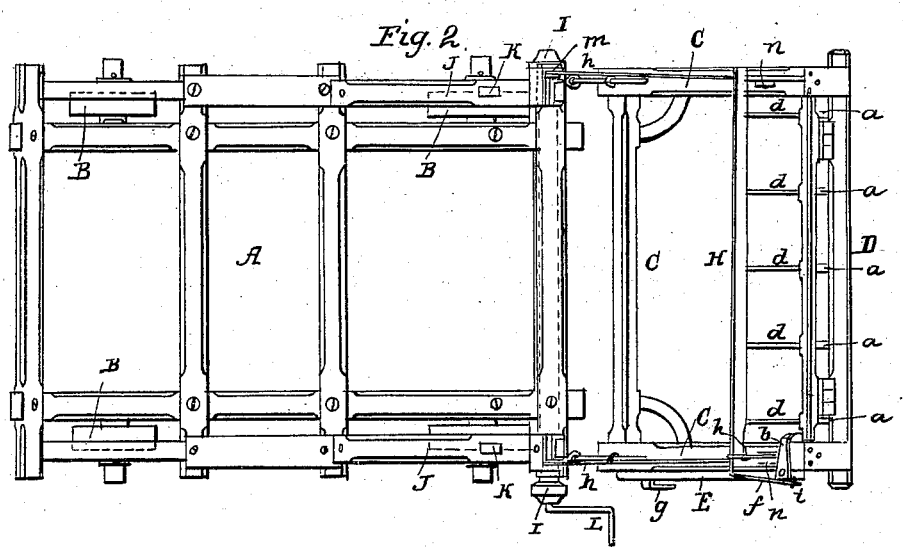
Witnesses:
John A. Ellis
Henry N. Miller
Inventor:
Nelson Gabel
per
J. H. Alexander
Atty

United States Patent Office.

NELSON GABEL, OF MINNEAPOLIS, KANSAS.

Letters Patent No. 98,581, dated January 4, 1870.

IMPROVEMENT IN HAY-RAKE AND LOADER.

The Schedule referred to in these Letters Patent and making part of the same.

To all whom it may concern:

Be it known that I, NELSON GABEL, of Minneapolis, in the county of Ottawa, and State of Kansas, have invented certain new and useful Improvements in Machines for Raking and Loading Hay; and I do hereby declare that the following is a full, clear, and exact description thereof, reference being had to the accompanying drawings, and to the letters of reference marked thereon, which form a part of this specification.

The nature of my invention consists in the construction and general arrangement of a machine for raking and loading hay, as will be hereinafter fully set forth.

In order to enable others skilled in the art to which my invention appertains, to make and use the same, I will now proceed to describe its construction and operation, referring to the annexed drawings, in which—

Figure 1 is a side elevation, and
Figure 2 is a plan view of my machine.

A represents a wagon, constructed in any suitable manner, on which to load the hay, said wagon being low, and mounted on four wheels, B B.

At the rear end of the wagon A is hinged a frame, C, in the outer end of which is pivoted the rake-head D.

The rake-head D is provided with teeth $a$ $a$, which point inward in the frame C, and are held at any angle with the said frame by means of a holder, $b$, on each side.

One of the holders $b$ is adjustable on the inner side of the frame C, while the other is attached to a lever, E, pivoted on the other side and the outside of said frame.

On the upper side of the rake-head D is hinged another rake-head, G, having a series of curved teeth, $d$ $d$, which pass through loops, or are otherwise secured on the under side of a bar, H, running parallel with the two rake-heads D and G.

The hinged rake, G H $d$, thus formed, is held upward from the rake D $a$ by means of a spring, $e$, secured to the frame C and to the bar H, in such a manner that when the said hinged rake has been drawn toward the other, in a manner that will be hereinafter described, and the force removed, the said spring will throw the rake outward again.

On the end of the bar H is a ratchet-bar, $f$, which, when said bar is drawn toward the frame C, catches on a bevelled projection, $i$, at the upper end of the lever E, holding the bar H, and the rake of which it forms a part, in that position until the lever E has been turned so as to release the ratchet-bar.

Under the rear end of the wagon A is a shaft, I, turned by a crank, L, which shaft is, at each end, at the sides of the wagon, provided with suitable pulleys for winding and unwinding the cords $h$ $h$, attached to the same.

The cord $h$, on each side of the wagon, passes upward around a pulley, $m$, placed near the upper rear end of an inclined beam, J, the lower front end of which is secured to a cross-beam on the wagon, and its rear end supported by a brace, K.

From the pulley $m$, the cord $h$ passes under and around another pulley, $n$, in the frame C, and thence to the end of the bar H, where it is secured.

The operation of the machine is as follows:

The frame C is let down in rear of the wagon, and the teeth-holders $b$ $b'$ adjusted, so as to give the rake-teeth $a$ $a$ the proper pitch for raking the hay, the hinged rake being held up away from the teeth $a$ $a$ by means of the spring $e$, as above described. As soon as enough hay has been raked together by the teeth $a$ $a$, the operator turns the crank L, winding up the cords $h$ $h$. This causes first the hinged rake G H $d$ to close down upon the hay until the ratchet-bar $f$ has caught on the bevelled projection $i$, when the frame C commences to rise until it rests against the ends of the beams J J. The cords $h$ $h$ are then loosened by turning the crank L in the opposite direction, and by turning the lever E, the ratchet-bar $f$ is released, when the spring $e$ at once throws this rake outward, allowing the hay to fall down on the wagon.

The lever E is held in proper position while raising the hay by the key $g$, and when it is turned to release the ratchet-bar $f$, it, at the same time, by means of the holder $b$ attached to it, turns the teeth $a$ $a$ inward over the wagon, preventing any of the hay from falling at the end of the wagon.

Having thus fully described my invention,
What I claim as new, and desire to secure by Letters Patent, is—

1. The hinged frame C, in combination with the rake D $a$ and teeth-holders $b$ $b$, substantially as and for the purposes herein set forth.

2. The combination of the hinged rake-head G, teeth $d$ $d$, bar H, and spring $e$, all substantially as and for the purposes herein set forth.

3. The arrangement of the pivoted lever E, with holder $b$, and bevelled projection $i$, and the ratchet-bar $f$, and key $g$, all substantially as and for the purposes herein set forth.

4. The combination and arrangement of the hinged frame C, rakes D $a$ and G H $d$, holders $b$ $b'$, spring $e$, lever E, key $g$, and ratchet-bar $f$, all constructed as described, and operated from the wagon A, by means of the pulley-shaft I, crank L, and cords $h$ $h$, substantially in the manner and for the purposes herein set forth.

5. The arrangement of the wagon A, pulley-shaft I, crank L, inclined beams J J, and braces K K, all substantially as shown and described.

In testimony that I claim the foregoing as my own, I affix my signature, in presence of two witnesses.

NELSON GABEL.

Witnesses:
H. S. WOODEN,
J. H. INGERSOLL.